United States Patent Office 3,834,984
Patented Sept. 10, 1974

3,834,984
METHOD OF INCORPORATING WATER SOLUBLE EPOXYPROPYL STARCH INTO PAPER
Robert E. Wing, Peoria, and William M. Doane, Morton, Ill., assignors to the United States of America as represented by the Secretary of Agriculture
No Drawing. Original application Dec. 21, 1971, Ser. No. 210,549, now Patent No. 3,795,671. Divided and this application Aug. 9, 1973, Ser. No. 386,921
Int. Cl. D21l 3/28
U.S. Cl. 162—175          2 Claims

ABSTRACT OF THE DISCLOSURE

A process is disclosed for preparing paper having incorporated therein an epoxypropyl starch. At epoxypropyl D.S. of up to .09 the compounds are water soluble and increase both wet and dry strength of paper at a 1-percent level of addition.

---

This is a division of application Ser. No. 210,549, filed Dec. 21, 1971, now U.S. Pat. 3,795,671.

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the preparation of starch derivatives and more specifically to starch derivatives containing pendant alkyl epoxides. The invention also relates to the use of epoxypropyl starches as paper additives which increase wet and dry strength.

Most alkyl epoxide-containing carbohydrates recorded in the literature have been prepared by reacting mono- and oligosaccharides with epichlorohydrin in the presence of a Lewis acid, with hypochlorous acid to first form chlorohydrins followed by dehydrochlorination with sodium hydroxide, or with allyl halides to first form allyl ether derivatives which are then oxidized with a peracid. This last method has been used to attach alkyl epoxides to a variety of monosaccharides, U.S. 3,414,560; E. W. Thomas, Carbohyd. Res. *13:* 225–228 (1970); and R. E. Wing et al., Carbohyd. Res. *12:* 285–289 (1970). However, no epoxides were formed by attempts to attach alkyl epoxy groups to the free hydroxyls on the glucose units of starch by reacting allyl starch with peracetic acid [Inano, Chem. Soc. Japan, Inc. Chem.-Sect. (Kogyo Kagaku Zasshi), Vol. 70, 9, 1550–1553 (1967)] or with a benzonitrile-50 percent hydrogen peroxide solution. Inano was able to achieve a reaction between sodium carboxymethyl starch and epichlorohydrin from which he obtained a water-insoluble product containing 1.4 mole percent carboxymethyl epoxypropyl groups.

The direct reaction of starch with epichlorohydrin in an aqueous alkaline solution is a commercial process which forms inhibited (i.e., crosslinked) starch products resistant to swelling or gelatinization. These products show marked inhibition to hot water swelling with as few as one epoxypropyl group per 1200 anhydroglucose units (AGU) of starch which corresponds to an epoxypropyl D.S. of 0.0008 [see B. M. Gough, Die Stärke, *8:* 240–243 (1967) for an explanation of the mechanism of crosslinks in this reaction].

Inhibited starches being essentially insoluble in water are limited to uses such as viscosity-stable pastes and water-resistant adhesives. However, water-soluble starches containing intact epoxide side chains would be useful in many areas especially as strength-increasing additives in various paper products.

We have discovered a process for producing epoxypropyl starches which can be either water-soluble or -insoluble depending on reaction conditions. It comprises the following steps:

a. reacting sodium hydride (NaH) with a starch or starch derivative, having free hydroxyl groups on the anhydroglucose units, in a dimethyl sulfoxide (DMSO) solution;
b. reacting the products resulting from step (a) with epichlorohydrin to form epoxypropyl starch; and
c. recovering the epoxypropyl starch from the reaction mixture.

Epoxypropyl starch is defined herein to include the products prepared from starch and starch derivatives.

A soluble product is obtained when about 0.18 to about 0.34 mole of NaH is reacted per mole (AGU) of starch or starch derivative. These products will have an epoxypropyl D.S. of about 0.03 to about 0.09. At reactant ratios greater than 0.34, the resulting products are water-insoluble. The general formula of the water-soluble epoxypropyl starch products is as follows:

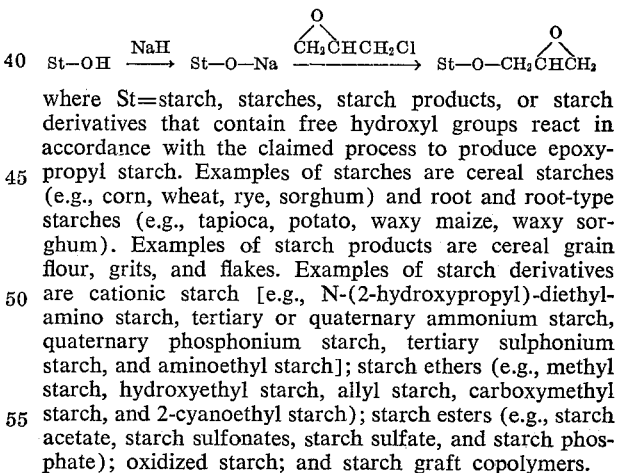

where St=starch or starch derivative having free hydroxyl groups and D.S.=the degree of substitution of the epoxypropyl group=0.03 to 0.09. The above water-soluble epoxypropyl starches are used in the manufacture of paper. Both the wet and dry strength of paper is increased when the products are applied at a 1-percent level of addition based on dry pulp weight.

DETAILED DESCRIPTION OF THE INVENTION

The reaction by which alkyl epoxides are attached to a starch substrate appears to be as follows:

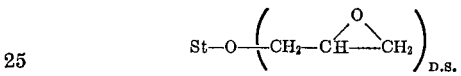

where St=starch, starches, starch products, or starch derivatives that contain free hydroxyl groups react in accordance with the claimed process to produce epoxypropyl starch. Examples of starches are cereal starches (e.g., corn, wheat, rye, sorghum) and root and root-type starches (e.g., tapioca, potato, waxy maize, waxy sorghum). Examples of starch products are cereal grain flour, grits, and flakes. Examples of starch derivatives are cationic starch [e.g., N-(2-hydroxypropyl)-diethylamino starch, tertiary or quaternary ammonium starch, quaternary phosphonium starch, tertiary sulphonium starch, and aminoethyl starch]; starch ethers (e.g., methyl starch, hydroxyethyl starch, allyl starch, carboxymethyl starch, and 2-cyanoethyl starch); starch esters (e.g., starch acetate, starch sulfonates, starch sulfate, and starch phosphate); oxidized starch; and starch graft copolymers.

It is understood that examples of starch, starch products, and starch derivatives other than those specifically stated above which react in accordance to the claimed process will be known to those skilled in the art, and that the invention should not be limited to those examples described above.

The solvent in which the reaction takes place should be nonaqueous and one in which starch is at least partially soluble. Water should be excluded as much as possible in order to minimize its reaction with NaH. Starch is soluble in DMSO making it the preferred solvent. However, the reaction can be conducted in dimethylformamide and tetrahydrofuran.

In the first step of the process the starch starting material dissolved in DMSO will theoretically react stoichiometrically with NaH depending on the number of free hydroxyl groups available. The preferred ratio of NaH to starting material is from 0.2 to 0.7 mole of NaH per AGU of starch or starch derivative which, after subsequent reaction with epichlorohydrin, gave final products having epoxypropyl D.S. levels of from 0.03 to 0.14. In order to produce a final product which is water-soluble, the ratio of reactants should be in the range of 0.18 to 0.34 mole NaH per AGU and the final epoxypropyl starch product should have a D.S. of from 0.03 to 0.09. This first step reaction should be conducted within a temperature range of from 6° C. to 100° C. These are the melting and decomposition temperatures of DMSO. At the preferred temperatures of from 25° C. to 60° C. the reaction will be complete within about one-half hour. However, reactions were usually allowed to proceed for up to 3 hours. The product of the reactions between NaH and starch or starch derivatives will herein be called "sodium-starch."

Although epichlorohydrin will essentially react stoichiometrically with sodium-starch, it is preferred that excess epichlorohydrin be used to insure complete reaction. This second step reaction should be conducted at temperatures below 100° C. to minimize evaporation of epichlorohydrin and because DMSO is still present. The reaction was allowed to proceed for as little as 1 hour and as long as 18 hours at a preferred temperature range of between 25° C. to 90° C. Neither temperature nor reaction time appears to be critical.

The third and final step in the process for producing epoxypropyl starch is product recovery, which can be performed in several ways such as solvent extraction. The easiest, most convenient, and preferred method is based on the product's insolubility in alcohol. After alcohol precipitation, the epoxypropyl starch is filtered, washed, and dried.

Water-soluble epoxypropyl starches prepared according to the invention having D.S. levels of from 0.03 to 0.09 were tested for their ability to increase paper strength using TAPPI Standard Method T 205 m–58, "Forming Handsheets for Physical Tests of Pulps," T 404 ts–66, "Tensile Breaking Strength of Paper and Paperboard," and T 456 os–68, "Wet Tensile Breaking Strength of Paper and Paperboard." Because of their complete water solubility and their lack of functional groups, epoxypropyl starches prepared from untreated gelatinized pearl corn starch were not sufficiently retained by the cellulose fibers to produce any significant increases in paper strength when added to pulp furnishes prior to preparing handsheets. Therefore, aqueous solutions of these products were sprayed onto wet paper mats prior to the final drying step at a 1-percent level of addition (based on dry fiber weight). The mats, with or without a subsequent acidic or basic treatment to cause oxirane ring opening, were heated at 75° C. for 1 hour before conditioning. Improvements were observed in wet breaking length of two to nine times and in dry breaking length of up to 20 percent over the untreated controls. The larger increases in wet-tensile strength were realized when the mats were treated with solutions of polyethylenimine, sodium carbonate, sodium bicarbonate, or acetic acid to effect ring opening. Increase in dry-tensile strength was larger when the mats were not treated with these solutions. The surface application of pearl corn starch to mats with the same subsequent treatments showed some increase in dry breaking length over the controls but no significant increase in wet breaking length.

To illustrate the use of starch derivatives as strength-increasing paper additives, a commercial cationic starch was treated by the DMSO-sodium hydride-epichlorohydrin system under various conditions which afforded epoxypropyl starches with a range of epoxypropyl D.S. of 0.048–0.076. Being cationic these products are sufficiently retained by cellulose fibers so that wet-end addition (i.e., addition to pulp furnish) can be used.

Handsheets were made containing an epoxypropylated (D.S. 0.064) cationic starch that had been added at a 1-percent level to a pulp furnish of pH 7.0. For comparison, handsheets were made containing a commercial cationic starch added under identical conditions. Handsheets prepared with the epoxypropyl starch increased in dry-tensile strength 27 percent and wet-tensile strength 200 percent over handsheets made with a commercial cationic starch. With furnish adjusted to pH 5.5, dry-tensile strength did not improve, but wet-tensile strength increased 350 percent. Results were similar with D.S. 0.048 and 0.076 epoxypropyl cationic starches. Addition levels of 0.25 and 0.50 percent gave smaller increases in wet tensile. When 10 percent clay was added to the furnish at pH 5.5, the addition of the cationic epoxypropyl derivative resulted in a 120-percent increase in wet-tensile and a 34-percent increase in ash content as compared with a commercial cationic starch. Various treatments of the handsheets after the second TAPPI press to promote further opening of the oxirane ring failed to show any additional strength increase. Evaluation of these products as spray-on additives by procedures reported for epoxypropyl starch revealed maximum increases of 35 and 220 percent in dry- and wet-tensile strength, respectively, when compared to the commercial cationic starch.

The following examples are intended to further illustrate but not limit the invention as claimed.

EXAMPLES 1–6

1. Untreated gelatinized pearl corn starch (10 g., 13 percent moisture) was stirred in DMSO (200 ml.) for 3 hours at 60° C., and then sodium hydride was added. After an additional 3 hours of stirring the reaction mixture was cooled to 25° C., epichlorohydrin (20 ml.) was added, and the mixture was stirred for 4 hours at 90° C. The mixture was cooled and poured into ethanol (2 liters). The solid was removed by filtration; washed with ethanol (1 liter), acetone (0.5 liter), and hexane (0.5 liter); and dried in a vacuum oven at 60° C.; yield 9.05 g., 0.03 D.S. In other examples one or more variables in the reaction were introduced (Table 1).

TABLE 1

| Example [a] | 1 | 2 | 3 | 4 | 5 | 6 |
|---|---|---|---|---|---|---|
| Moisture of pearl starch, percent | 13 | 13 | 2 | 13 | 2 | 13 |
| Weight of ether-washed NaH[b], g | 0.435 | 0.23 | 0.435 | 0.435 | 0.435 | 0.87 |
| Temperature of reaction mixture when NaH added, °C | 60 | 25 | 25 | 25 | 60 | 25 |
| NaH added as | Solid | Slurry in DMSO.[c] | Slurry in DMSO. | Slurry in DMSO. | Slurry in DMSO. | Slurry in DMSO. |
| Temperature of mixture when epichlorohydrin added, °C | 25 | 25 | 25 | 25 | 60 | 25 |
| Temperature and time of reaction, °C.-hours | 90–4 | 90–2 | 90–2 | 25–18, 90–1 | 60–1 | 25–18, 90–1 |
| Weight of product, g | 9.05 | 8.89 | 10.56 | 9.81 | 10.24 | 11.13 |
| Chlorine, percent | 0.49 | 0.31 | 0.54 | 0.61 | 0.78 | 3.96 |
| D.S.[d] | 0.03 | 0.05 | 0.07 | 0.09 | 0.105 | 0.14 |
| Solubility in water[e] | Soluble | Soluble | Soluble | Soluble | Mostly insoluble. | Mostly insoluble. |

[a] In each example 10.0 g. pearl corn starch was used.
[b] NaH = sodium hydride.
[c] DMSO = dimethyl sulfoxide.
[d] Determined by pyridine hydrochloride method of Inano, supra.
[e] Derivative (1.5 g.) in 100 ml. water at 90° C. for 1 hour; then cool.

EXAMPLES 7-10

7. A commercial cationic starch [N-(2-hydroxypropyl)-diethylamino starch, D.S. less than 0.05, 10 g., 9.2 percent moisture] was stirred in DMSO (200 ml.) for 2 hours at 80° C., cooled to 25° C., and sodium hydride (0.165 g.) added as slurry in DMSO (50 ml.). After an additional 4 hours of stirring, epichlorohydrin (20 ml.) was added and the mixture was stirred for 18 hours at 25° C., then 1 hour at 80° C. The mixture was cooled and poured into ethanol (2 liters). The solid was removed by filtration, washed with ethanol (1 liter), acetone (0.5 liter), and hexane (0.5 liter), and dried in a vacuum oven at 60° C.; yield 9.4 g. An oxirane analysis conducted by the pyridine hydrochloride method of Inano, supra, gave an epoxypropyl content which corresponded to a D.S. of 0.048. In other examples the ratio of reactants was varied to give products of different D.S. (Table 2).

placed in an oven at 75° C. for 1 hour. After drying they were then conditioned and tested for wet and dry breaking length by TAPPI Standard Methods, supra (Table 3). The basis weight of handsheets was 60 g./m.$^2$.

TABLE 3
Physical testing (breaking length, m.) of handsheets treated with epoxypropyl starch

| | Epoxypropyl starch (D.S.)[b] | | | | | | | | | | Control | |
|---|---|---|---|---|---|---|---|---|---|---|---|---|
| | [c] 0.00 | | 0.03 | | 0.05 | | 0.07 | | 0.09 | | | |
| Treatment [a] | Dry | Wet | Dry | Wet | Dry | Wet | Dry | Wet | Dry | Wet | Dry | Wet |
| None [d] | 7,940 | 155 | 7,283 | 250 | 8,294 | 560 | 8,152 | 495 | 7,734 | 550 | 6,879 | 100 |
| Water | 7,100 | 125 | 6,904 | 235 | 7,772 | 555 | 8,019 | 425 | 7,437 | 395 | 5,892 | 130 |
| 4% Na$_2$CO$_3$ | 6,440 | 150 | 6,295 | 305 | 7,170 | 870 | 7,448 | 555 | 7,300 | 640 | 5,567 | 150 |
| 4% NaHCO$_3$ | 6,590 | 140 | 6,278 | 270 | 7,138 | 690 | 7,107 | 560 | 7,238 | 725 | 4,796 | 135 |
| 2% NaHCO$_3$ plus 2% Na$_2$CO$_3$ | 6,200 | 150 | 5,970 | 300 | 7,713 | 835 | 7,886 | 645 | 7,841 | 795 | 5,643 | 125 |
| 4% Et$_3$N | 7,170 | 130 | 6,866 | 185 | 7,310 | 515 | 6,892 | 420 | 7,451 | 510 | 5,738 | 110 |
| 4% PEI-6 [e] | 6,850 | 200 | 6,566 | 355 | 7,557 | 900 | 7,713 | 815 | 7,162 | 805 | 5,882 | 180 |
| 4% CH$_3$COOH | 6,450 | 165 | 6,381 | 240 | 7,995 | 730 | 7,820 | 505 | 6,984 | 700 | 5,457 | 120 |

[a] Added to about 1 g. wet pickup.
[b] About a 1-percent addition.
[c] Untreated gelatinized pearl corn starch.
[d] No chemical spray applied.
[e] Polyethylenimine-molecular weight, 600 (Dow Chemical Co.).

TABLE 2

| Example [a] | 7 | 8 | 9 | 10 |
|---|---|---|---|---|
| Weight of ether-washed NaH [b], g. | 0.165 | 0.33 | 0.50 | 0.33 |
| Weight of product, grams | 9.40 | 9.65 | 9.84 | 9.50 |
| Chlorine, percent [c] | 0.65 | 0.80 | 1.36 | 0.81 |
| Epoxypropyl D.S. [d] | 0.048 | 0.065 | 0.076 | 0.064 |

[a] In each example 10.0 g. cationic starch was used. Temperature and time of reaction (° C.-hour); 25–18 then 80–1.
[b] NaH = sodium hydride.
[c] Cationic starch = 0.78 percent chlorine.
[d] Determined by pyridine hydrochloride method of Inano, supra.

EXAMPLE 11

Unbleached kraft pulp was refined in a 5-lb. Valley beater to a freeness of 590 ml. CSF. Wet paper mats were prepared at pH 7 in a British sheet machine, pressed according to TAPPI Standard Methods, and used without further drying. At this point solutions of the epoxypropyl starch products from Examples 1–4 were prepared by placing 1.5 g. of each product in 100 ml. of water and stirring at 90° C. for 1 hour. Each solution was cooled and applied to the wet paper mats by spraying with a bottle sprayer under constant air pressure to a level of about 1 percent starch based on the dry weight of the cellulose fibers. The mats were allowed to air-dry for 15 min. and then were again sprayed with the various acidic and basic solutions to a 1 g. wet pickup (Table 3). The mats were mounted in TAPPI standard rings and placed in an oven at 75° C. for 1 hour.

EXAMPLE 12

Unbleached softwood sulfate pulp [15 g., oven-dry (o.d.) basis] was slurried in a British Disintegrator at 1 percent consistency and diluted to 6150 g. with tap water. With continuous mixing, the additives (0.15 g./100 ml. water) were added to the pulp slurry and the pH was adjusted with 10 percent sulfuric acid. Handsheets (60 g./m.$^2$) were made with no further pH adjustment in the sheet mold. After pressing, some of the sheets were oven dried, or sprayed with a carbonate-bicarbonate solution, and then the sheets were conditioned and tested according to TAPPI Standard Methods, supra, Table 4. Clay was used in some tests at a 10 percent level and was added before pH adjustment, Table 5.

TABLE 4
Breaking length, m. of handsheets treated with epoxypropyl cationic starch [a]

| | Standard TAPPI conditioning [d] | |
|---|---|---|
| Samples [b] [c] | Dry | Wet |
| pH 7.0: | | |
| Control | 6,280 | 160 |
| 1% cationic starch [e] | 6,530 | 185 |
| 1% 0.064 D.S.[i] | 8,280 | 560 |
| pH 5.5: | | |
| Control | 6,260 | 160 |
| 1% cationic starch [e] | 7,400 | 165 |
| 1% 0.048 D.S.[f] | 7,410 | 735 |
| 1% 0.065 D.S.[g] | 7,120 | 735 |
| 1% 0.076 D.S.[h] | 7,380 | 805 |
| 0.25% cationic starch [e] | 6,570 | 140 |
| 0.50% cationic starch [e] | 7,020 | 150 |
| 0.25% 0.048 D.S.[f] | 6,740 | 350 |
| 0.50% 0.048 D.S.[f] | 6,890 | 440 |

[a] Applied as wet-end additive.
[b] Samples were stirred in water (100 ml.) at 90° C. for 30 minutes before adding to furnish at various levels.
[c] D.S. refers to epoxypropyl D.S. of certain epichlorohydrin-treated cationic starch samples.
[d] Thirty-minute immersion in distilled water for wet tensile.
[e] N-(2-hydroxypropyl)-diethylamino starch.
[f] Product of Example No. 7.
[g] Product of Example No. 8.
[h] Product of Example No. 9.
[i] Product of Example No. 10.

TABLE 5
Breaking Length, m. and Ash Content of Handsheets Treated with Epoxypropyl Cationic Starch and Clay [a]

| | Treatment [b] | | | | | | | | |
|---|---|---|---|---|---|---|---|---|---|
| | Standard TAPPI methods | | 1 hour, 75° C. | | 10 minutes, 105° C. | | 2% Na$_2$CO$_3$[c], 2% NaHCO$_3$, 1 hour, 75° C. | | Ash, percent |
| Sample evaluated | Dry | Wet | Dry | Wet | Dry | Wet | Dry | Wet | |
| pH 7.0: | | | | | | | | | |
| Control | 5,780 | 160 | 6,130 | 170 | 6,070 | 160 | 5,780 | 200 | 1.15 |
| 1% cationic starch [d] | 6,250 | 140 | 6,320 | 150 | 6,230 | 150 | 5,500 | 180 | 0.86 |
| 1% 0.064 D.S.[d] [e] | 6,240 | 170 | 6,610 | 185 | 6,310 | 195 | 5,440 | 220 | 1.39 |
| pH 5.5: | | | | | | | | | |
| Control | 6,600 | 165 | 7,030 | 205 | 6,730 | 180 | 6,420 | 220 | 1.29 |
| 1% cationic starch [d] | 7,600 | 170 | 7,980 | 205 | 7,870 | 200 | 7,680 | 260 | 1.69 |
| 1% 0.064 D.S.[d] [e] | 7,230 | 380 | 7,390 | 490 | 7,720 | 470 | 7,100 | 585 | 2.27 |

[a] Applied as wet-end additive; 10 percent clay.
[b] Various treatments after second TAPPI press.
[c] Sprayed on to a 1 g. wet pickup after second TAPPI press.
[d] Samples of N-(2-hydroxypropyl)-diethylamino starch (0.15 g., D.S.) were stirred in water (100 ml.) at 90° C. for 30 minutes.
[e] D.S. of epoxypropyl cationic starch of Example 10.

EXAMPLE 13

The product of Example 10 was applied to wet paper mats as described in Example 11 and tested for breaking length, Table 6.

TABLE 6

Breaking length, m. of handsheets treated with D.S. 0.064 epoxypropy cationic starch as a spray-on additive

| Treatment[a] pH 7.0 | Control | | Cationic starch[b] | | 0.064 D.S. epoxypropyl cationic starch[b] | |
|---|---|---|---|---|---|---|
| | Dry | Wet | Dry | Wet | Dry | Wet |
| None[c] | 6,880 | 205 | 6,270 | 195 | 7,280 | 400 |
| Water | 6,200 | 205 | 5,720 | 185 | 7,000 | 410 |
| 4% Na$_2$CO$_3$ | 5,850 | 230 | 5,315 | 210 | 6,840 | 670 |
| 4% NaHCO$_3$ | 6,390 | 230 | 5,960 | 225 | 7,430 | 580 |
| 2% Na$_2$CO$_3$ plus 2% NaHCO$_3$ | 6,200 | 245 | 5,640 | 210 | 7,360 | 645 |
| 4% Et$_3$N | 5,670 | 180 | 5,810 | 205 | 7,430 | 495 |
| 4% PEI-6[d] | 6,460 | 300 | 5,480 | 280 | 7,360 | 730 |
| 4% CH$_3$COOH | 6,150 | 215 | 5,270 | 185 | 6,920 | 480 |

[a] Added to about 1 g. wet pickup; then dried 1 hour at 75° C.
[b] About 1 percent addition.
[c] No chemical spray applied.
[d] Polyethylenimine-molecular weight 600 (Dow Chemical Co.).

We claim:

1. In the production of paper an improvement which increases both wet and dry strength comprising the addition of about 1 percent, based on dry pulp weight, of a water-soluble epoxypropyl starch comprising the following structure:

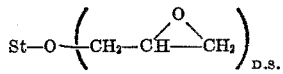

where St is starch or starch derivative having free hydroxyl groups on the anhydroglucose units and D.S. is 0.03 to 0.09, the addition being made by spraying an aqueous solution of said epoxypropyl starch onto a wet paper mat prior to drying.

2. In the production of paper an improvement which increases both wet and dry strength comprising the addition of from 0.25 to 1 percent, based on dry pulp weight, of a water-soluble epoxypropyl starch comprising the following structure:

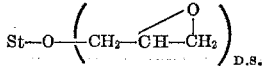

where St is catonic starch having free hydroxyl groups on the anhydroglucose units and D.S. is 0.05 to 0.08, the addition being made to a paper pulp slurry prior to the laying of a wet paper mat.

References Cited

UNITED STATES PATENTS 3,414,530   12/1968   Zilkha et al. _____ 260—233.3 R

OTHER REFERENCES

Hamerstand et al.: "Determination of the Extent of Reaction Between Epichlorohydrin and Starch," Cereal Chemistry, vol. 37, No. 4, July 1960.

S. LEON BASHORE, Primary Examiner

W. F. SMITH, Assistant Examiner

U.S. Cl. X.R.

162—186